US009559528B2

United States Patent
Kim et al.

(10) Patent No.: US 9,559,528 B2
(45) Date of Patent: Jan. 31, 2017

(54) APPARATUS AND METHOD WITH ACTIVE BALANCING CIRCUIT AND ACTIVE BALANCING ALGORITHM FOR CHARGING AND DISCHARGING SECONDARY BATTERIES CONNECTED IN SERIES

(71) Applicants: LG CNS CO., LTD., Seoul (KR); HBL Corporation, Daejeon (KR)

(72) Inventors: Jeong Moog Kim, Seoul (KR); Hwan Hee Lee, Seoul (KR); Tae Hyoung Ryu, Seoul (KR); Dong Hoon Shin, Seoul (KR); Cheol Kyu Han, Seoul (KR)

(73) Assignees: HBL CORPORATION, Daejeon (KR); LG CNS CO., LTD., Seoul (KR)

( * ) Notice: Subject to any disclaimer, the term of this patent is extended or adjusted under 35 U.S.C. 154(b) by 258 days.

(21) Appl. No.: 14/278,676

(22) Filed: May 15, 2014

(65) Prior Publication Data

US 2014/0340044 A1 Nov. 20, 2014

(30) Foreign Application Priority Data

May 15, 2013 (KR) ........................ 10-2013-0054978

(51) Int. Cl.
*H02J 7/00* (2006.01)

(52) U.S. Cl.
CPC ............ *H02J 7/0014* (2013.01); *H02J 7/0016* (2013.01); *H02J 7/0003* (2013.01); *Y02T 10/7055* (2013.01)

(58) Field of Classification Search
CPC .................................................. H02J 7/0014

USPC ......................................................... 320/118
See application file for complete search history.

(56) References Cited

U.S. PATENT DOCUMENTS

| 6,121,751 A | 9/2000 | Merritt |
| 6,388,424 B1 | 5/2002 | Hidaka et al. |
| 2002/0047685 A1 | 4/2002 | Perelle |
| 2006/0261783 A1* | 11/2006 | Gamboa ............. H01M 10/425 320/138 |
| 2010/0001737 A1 | 1/2010 | Kubo et al. |

(Continued)

FOREIGN PATENT DOCUMENTS

| CN | 101908824 | 12/2010 |
| CN | 102684273 | 9/2012 |

(Continued)

OTHER PUBLICATIONS

Japan Patent Office Application Serial No. 2014-100479, Office Action dated Apr. 7, 2015, 2 pages.

(Continued)

*Primary Examiner* — Edward Tso
*Assistant Examiner* — Ahmed Omar
(74) *Attorney, Agent, or Firm* — Lee Hong Degerman Kang & Waimey (57) ABSTRACT

An active balancing control apparatus and method with an active balancing algorithm to charge and discharge a plurality of batteries connected in series. The active balancing control apparatus may be designed to simultaneously charge and discharge a plurality of batteries, connected in series and having different charge/discharge characteristics, using an active balancing circuit. The apparatus may perform switching to achieve balancing of each of the batteries so that all the batteries may be charged at a maximum voltage.

12 Claims, 9 Drawing Sheets

(56) References Cited

U.S. PATENT DOCUMENTS

2014/0320067 A1* 10/2014 Ling .................. H02J 7/0018
320/107

FOREIGN PATENT DOCUMENTS

| | | |
|---|---|---|
| CN | 104079056 | 10/2014 |
| EP | 2784902 | 10/2014 |
| JP | 2002-186191 | 6/2002 |
| JP | 2003-087987 | 3/2003 |
| JP | 2011-109901 | 6/2011 |
| JP | 2012-516672 | 7/2012 |
| KR | 10-0969589 | 7/2010 |
| WO | 2010/087545 | 8/2010 |
| WO | 2010/087608 | 8/2010 |
| WO | 2011/053951 | 5/2011 |
| WO | 2013/007881 | 1/2013 |

OTHER PUBLICATIONS

European Patent Office Application Serial No. 14168108.0, Search Report dated Dec. 4, 2014, 10 pages.
Korean Intellectual Property Office Application Serial No. 10-2013-0054978, Office Action dated May 16, 2014, 4 pages.
The State Intellectual Property Office of the People's Republic of China Application Serial No. 201410204702.1, Office Action dated Nov. 18, 2015, 9 pages.

* cited by examiner

APPARATUS AND METHOD WITH ACTIVE BALANCING CIRCUIT AND ACTIVE BALANCING ALGORITHM FOR CHARGING AND DISCHARGING SECONDARY BATTERIES CONNECTED IN SERIES

CROSS-REFERENCE TO RELATED APPLICATIONS

Pursuant to 35 U.S.C. §119(a), this application claims the benefit of earlier filing date and right of priority to Korean Patent Application No. 10-2013-0054978, filed on May 15, 2013, the contents of which are hereby incorporated by reference herein in their entirety.

BACKGROUND

1. Field of the Invention

The present invention relates to a secondary battery charge/discharge control apparatus and method with an active balancing circuit and algorithm to charge and discharge a plurality of secondary batteries connected in series.

2. Description of the Related Art

Large-capacity lithium secondary batteries used in electric vehicles each have a relatively low operating voltage, for example, a voltage of about 2 volts (V) to about 4.7 V, and a relatively high operating current, for example, a current of about 25 amperes (A) to about 50 A.

In an electric vehicle, tens to hundreds of large-capacity lithium secondary batteries are connected and used. In the process of manufacturing a battery assembly, a battery of a unit module (for example, a single battery, or a few batteries are connected in parallel or in series) needs to be charged and discharged at maximum capacity. However, there are several technical difficulties, such as low conversion efficiency for converting electric energy to an alternating current (AC), and for recycling the electric energy.

In an apparatus for simultaneously charging and discharging a large-capacity secondary battery in a switch mode, a single lithium secondary battery with an operating voltage of about 2 V to about 4.7 V may be discharged. Electricity obtained by the discharging may need to be regenerated in a nationwide AC grid by consuming the electricity as heat, or by converting the electricity to AC electricity.

A direct current (DC)-to-AC (DC/AC) converter used to regenerate power may have extremely low conversion efficiency, for example typically 40%, since a voltage of a single battery is considerably lower than a voltage of a commercial AC grid (for example, 220 V or 380 V). During conversion, remaining energy may be consumed as heat in the DC/AC converter.

Accordingly, a process of using a conventional secondary battery charge/discharge apparatus is known to use the most power in a factory of manufacturing batteries including conditioning equipment for cooling. When secondary batteries having slightly different capacities and slightly different internal resistances are connected in series and are charged and discharged by a single bidirectional constant current power supply, it may be difficult to charge and discharge each of the plurality of secondary batteries at a constant voltage (CV) due to a difference in characteristics of the secondary batteries, and overcharge or overdischarge may occur.

A technical configuration associated with a battery pack control module and a method of using the same for balancing of a plurality of lithium secondary batteries or groups of lithium secondary batteries is disclosed in Korean Patent Publication No. 10-2011-0008337. Additionally, a technical configuration including discharge route circuits for each secondary battery connected in series and for protecting overcharge is disclosed in Korean Patent Publication No. 10-2010-0122911. However, in that disclosure, because each of the plurality of secondary batteries includes a separate discharge resistor and a switching element to form a discharge route circuit, power consumption, and manufacturing costs may increase.

SUMMARY

An aspect of the present invention is to overcome a difference in characteristics between secondary batteries, connected in series and having different capacities and different internal resistances, and to enable constant voltage (CV) charge/discharge in a series circuit, by adding an active balancing circuit configured to add or subtract a predetermined amount of current at both ends of each of the secondary batteries, when the secondary batteries are charged and discharged by a single bidirectional constant current source.

Another aspect of the present invention is to enable balancing of all batteries within each of a plurality of trays during CV charging, using an active balancing circuit with an extremely small capacity in each secondary battery charge/discharge circuit. This is because batteries manufactured in the same process are generally different from each other in characteristics (for example, an internal resistance, capacity, and the like) typically by a relatively low value, for example about 5%, that is set by a user to determine whether a battery is good or faulty. Another reason is that capacity distribution between batteries manufactured in the same process is not very large.

Still another aspect of the present invention is to reduce manufacturing costs by configuring an apparatus with a single bidirectional direct current (DC)-to-DC (DC/DC) converter, a single bidirectional linear current source, and a single controller, to innovatively increase a power conversion efficiency by using discharged electricity to perform charging in a DC state without a change, to significantly reduce size and weight, and to significantly reduce installation space, when a plurality of secondary batteries within a single tray are connected in series, and are simultaneously charged and discharged.

According to an aspect of the present invention, there is provided a secondary battery charge/discharge control apparatus and method with an active balancing circuit and algorithm that are designed and manufactured to simultaneously charge and discharge a plurality of secondary batteries, connected in series within a single tray and having different charge/discharge characteristics, for example capacity, internal resistance, and the like, by using the active balancing circuit and a switching circuit. This is commonly done to achieve balancing of each of the plurality of secondary batteries so that all the plurality of secondary batteries are charged and discharged in a CV mode at a set voltage.

According to another aspect of the present invention, there is provided a secondary battery charge/discharge control apparatus and method with an active balancing circuit and algorithm that may enable constant current (CC) and CV charge/discharge, despite different characteristics of secondary batteries connected in series. This may be accomplished by actively adjusting the different characteristics to maintain a CV when the same amount of current flows in circuit components of a series circuit in which the plurality of secondary batteries are connected in series. Additionally, when a small capacity, for example about 5% of the total capacity, is adjusted by the active balancing circuit due to distribution of a capacity or internal resistance in a narrow range, for example about 5%, a balancing circuit with a sufficiently small capacity may be connected to each of secondary battery charge/discharge circuits.

According to another aspect of the present invention, there is provided a secondary battery charge/discharge control apparatus and method with an active balancing circuit and algorithm that may simultaneously charge and discharge a plurality of secondary batteries connected in series within a single tray, using a single bidirectional DC/DC converter and a bidirectional linear current source, and that may terminate charging and discharging when all the plurality of secondary batteries have the same current values at a maximum voltage when charging and discharging are performed in a CC mode, and then performed in a CV mode using the active balancing circuit.

In some embodiments, the secondary battery charge/discharge control apparatus and method may enable a plurality of batteries connected in series to be simultaneously charged and discharged, using the active balancing circuit and a relay to achieve balancing of each of the batteries so that the batteries may be charged at a set maximum voltage in a constant voltage (CV) mode, in an apparatus for simultaneously charging and discharging a plurality of secondary batteries connected in series. The batteries may have different charge/discharge characteristics, because capacities and internal resistances of the batteries are not exactly the same.

In still other embodiments, in charging and discharging of a plurality of secondary batteries that are connected in series where such batteries have different charge/discharge characteristics, using a constant current source, when the same current and a maximum voltage are maintained, the charging may be terminated.

According to embodiments of the present invention, it is possible to terminate, in the same current state at a set maximum voltage, charging and discharging of all of a plurality of secondary batteries, connected in series and having different charge/discharge characteristics, when the plurality of secondary batteries are simultaneously charged and discharged in both a constant current (CC) mode and a constant voltage (CV) mode.

Additionally, according to embodiments of the present invention, it is possible to charge and discharge secondary batteries connected in series, by compensating for, using an active balancing circuit, different characteristics of the secondary batteries, for example a capacity, internal resistance, and the like, so that the secondary batteries have equivalently, exactly the same characteristics.

Furthermore, according to embodiments of the present invention, it is possible to reduce manufacturing costs, to significantly reduce size and weight, and to significantly reduce installation space, by configuring an apparatus with a single bidirectional direct current (DC)-to-DC (DC/DC) converter, a single bidirectional linear current source, and a single controller, when a plurality of secondary batteries within a single tray are connected in series, and are simultaneously charged and discharged.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

In various embodiments, when the same amount of current flows in circuit components of a series circuit in which batteries are connected in series, and when the batteries have slightly different characteristics, for example a capacity and an internal resistance, the different characteristics may be compensated for using an active balancing circuit configured to actively control the different characteristics to maintain a constant voltage (CV). Accordingly, secondary batteries having equivalently, exactly the same characteristics may be connected in series, and may be charged and discharged.

Additionally, when batteries manufactured in the same process are different from each other in characteristics (for example, an internal resistance, capacity, and the like) typically by a relatively low value, for example about 5%, and when a small capacity, for example about 5% of the total capacity, is adjusted by an active balancing circuit due to distribution of capacity or internal resistance in a narrow range, for example about 5%, an active balancing circuit with a sufficiently small capacity may be connected to each of a plurality of secondary battery charge/discharge circuits.

Embodiment 1

Figure 1:
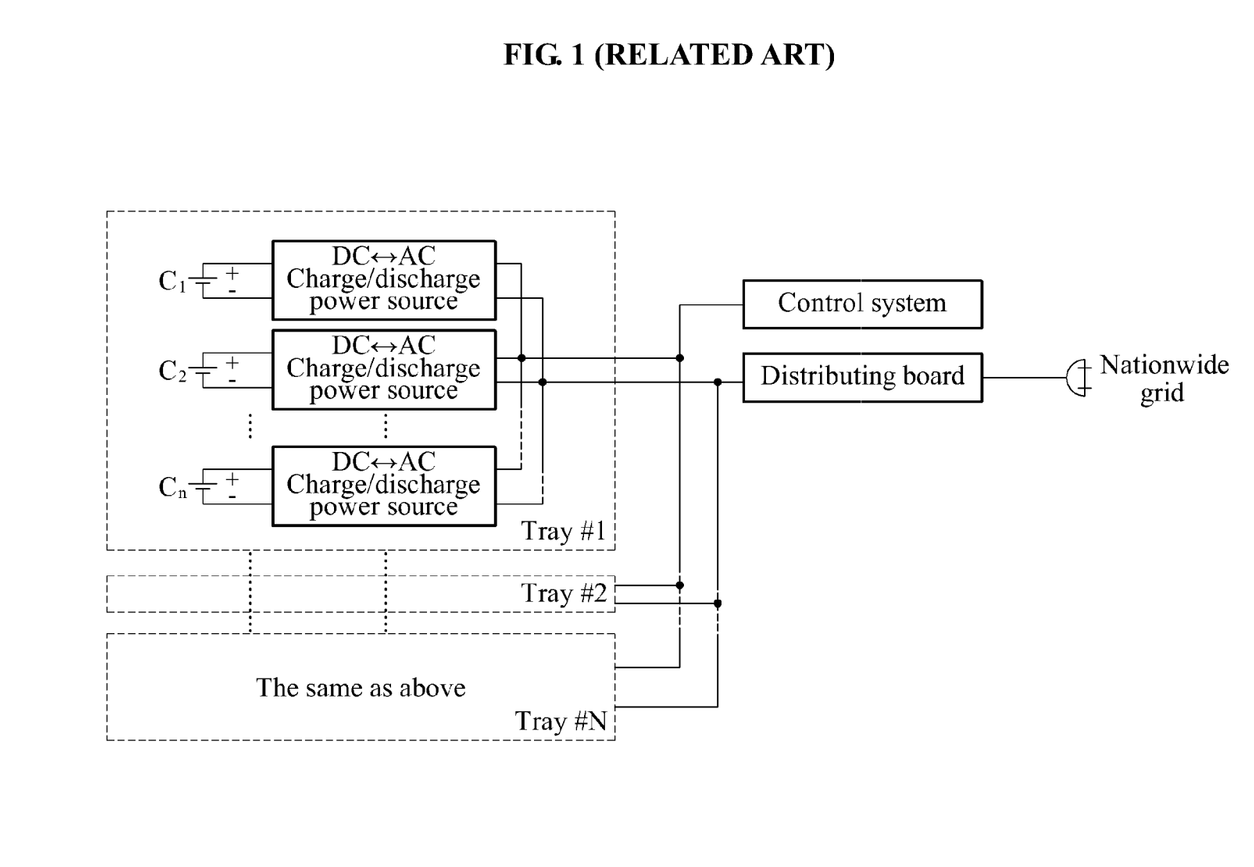
FIG. 1 is a diagram illustrating an individual secondary battery charge/discharge apparatus according to the related art.

Embodiment 1 relates to a secondary battery charge/discharge control apparatus with an active balancing circuit and algorithm to charge and discharge a plurality of batteries connected in series. FIG. 1 is a diagram illustrating an individual secondary battery charge/discharge apparatus according to the related art. The individual secondary battery charge/discharge apparatus of FIG. 1 may encounter the issue in which high installation costs and wide space are required, and a power recovery rate is low, because each of a plurality of batteries are charged and discharged using a direct current (DC)-to-alternating current (AC) power supply of each of the batteries.

Figure 2:
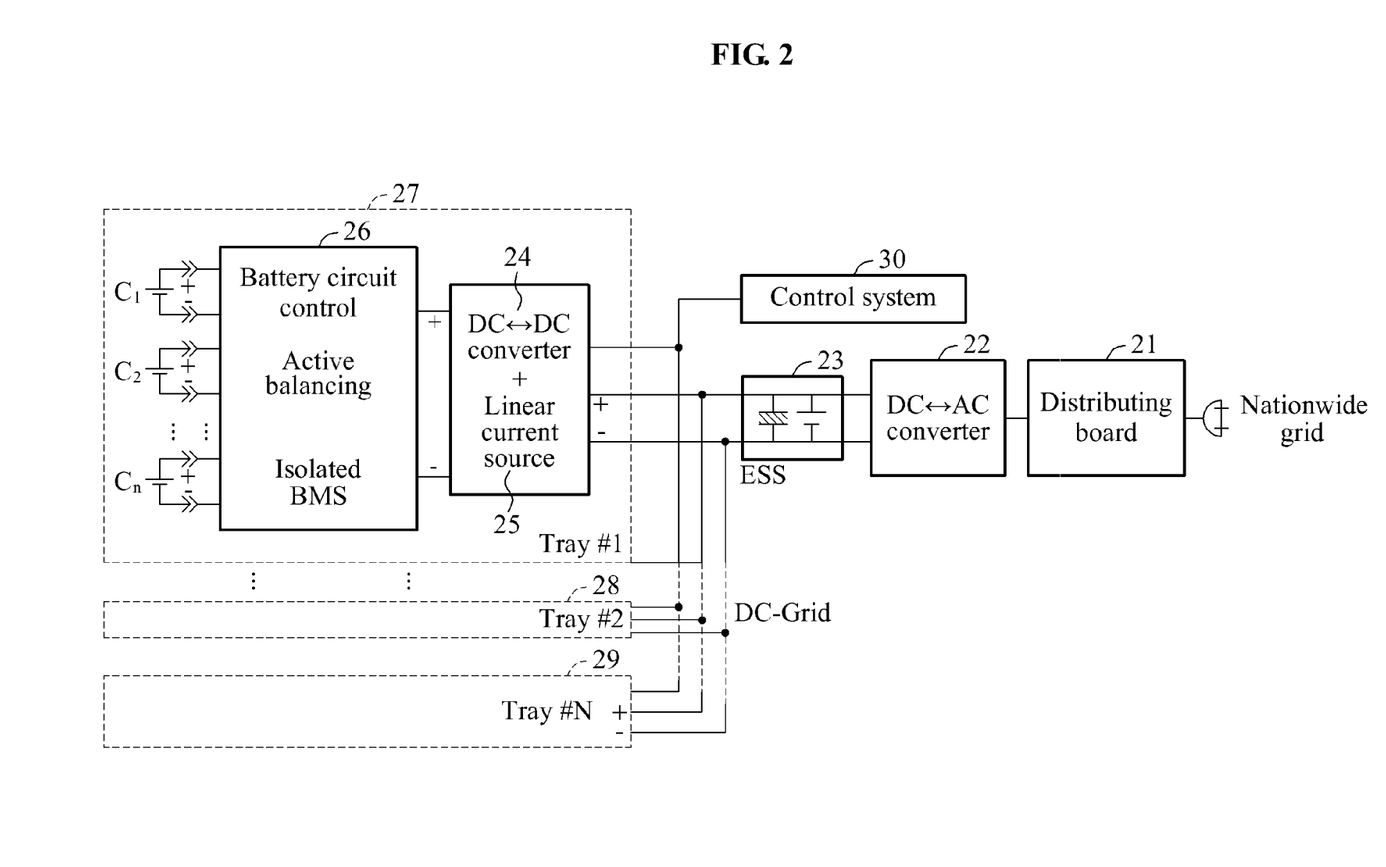
FIG. 2 is a diagram illustrating a secondary battery charge/discharge control apparatus with an active balancing circuit to charge and discharge a plurality of secondary batteries connected in series according to an embodiment of the present invention.

FIG. 2 is a diagram illustrating a secondary battery charge/discharge control apparatus with an active balancing circuit to charge and discharge a plurality of secondary batteries connected in series according to an embodiment of the present invention. In the present disclosure, the terms "charging and discharging" and "charge/discharge" may be interchangeably used with respect to each other. Additionally, the terms "lithium secondary battery," "secondary battery," and "battery" may be interchangeably used with respect to each other. Furthermore, the terms "central processing unit (CPU)," "controller including a CPU," and "controller" may be interchangeably used with respect to each other. The controller may include a control program, and may be configured to perform charging and discharging based on the control program. In addition, in different drawings, different reference numerals may be assigned to the same element.

An apparatus for charging and discharging each of a plurality of secondary batteries according to an embodiment of the present invention may increase power conversion efficiency by converting a voltage increased by connecting in series tens to hundreds of batteries, each having a relatively low voltage (for example, a voltage of 2 volts (V) to 4.7 V), using a bidirectional DC-to-DC (DC/DC) converter. Additionally, the apparatus may set a voltage of a DC charge/discharge apparatus to be about twice a maximum voltage of a battery group, and may increase a resolution and efficiency during power control. Furthermore, the apparatus may recycle power of a discharged battery so that the recycled power may be used to perform charging without a loss.

Referring to FIG. 2, commercial power may be input through a distributing board 21. The commercial power supplied through the distributing board 21 may be stored in a DC energy storage system (ESS) 23 through a bidirectional AC-to-DC (AC/DC) converter 22.

The DC ESS 23 may connect electrolytic condensers and/or super condensers in series or in parallel, and may have a required voltage and capacity. Each of the electrolytic condensers and/or super condensers may have a capacity of hundreds of faraday (F). A power output through the DC ESS 23 may be electrically connected to a bidirectional DC/DC converter 24 that is installed in each of trays 27, 28 and 29. The power may be electrically connected to a linear current source 25, so that a plurality of batteries connected in series may be charged and discharged.

The DC ESS 23 may function to stably supply electricity to the bidirectional DC/DC converter 24. Additionally, during power outage, the DC ESS 23 may enable charging and discharging to be continuously performed, by stably supplying electricity to the bidirectional DC/DC converter 24 for a predetermined period of time.

The bidirectional DC/DC converter 24 and the linear current source 25 may be installed each of trays 27, 28 and 29, so that each of the plurality of batteries connected in series may be charged and discharged. Control system 30 is shown operatively coupled to DC/DC converter 24 of each of the plurality of trays.

According to embodiments of the present invention, the linear current source 25 may be used to perform charging and discharging and accordingly, it is possible to more efficiently perform charging and discharging, regardless of the number of the batteries. Thus, it is possible to efficiently charge and discharge tens to hundreds of batteries connected in series, regardless of a change in voltage between both ends of a battery group based on the number of the batteries.

Additionally, according to embodiments of the present invention, a voltage may be increased by the number of batteries connected in series and accordingly, a power conversion efficiency of the bidirectional DC/DC converter 24 may be remarkably increased.

In an apparatus configured to simultaneously charge and discharge a large number of batteries, power may be converted by increasing voltage of both ends of a battery group by connecting the batteries in series and accordingly, an energy efficiency may be increased over 80%. Thus, it is possible to obtain an advantageous effect of saving a large amount of energy.

To increase a resolution during power control, the secondary battery charge/discharge control apparatus of FIG. 2 may be desirably configured to set an appropriate voltage of a DC charge/discharge apparatus to be about twice a maximum voltage applied to both ends of a battery group including batteries connected in series. However, the appropriate voltage may be changed.

Figure 3:
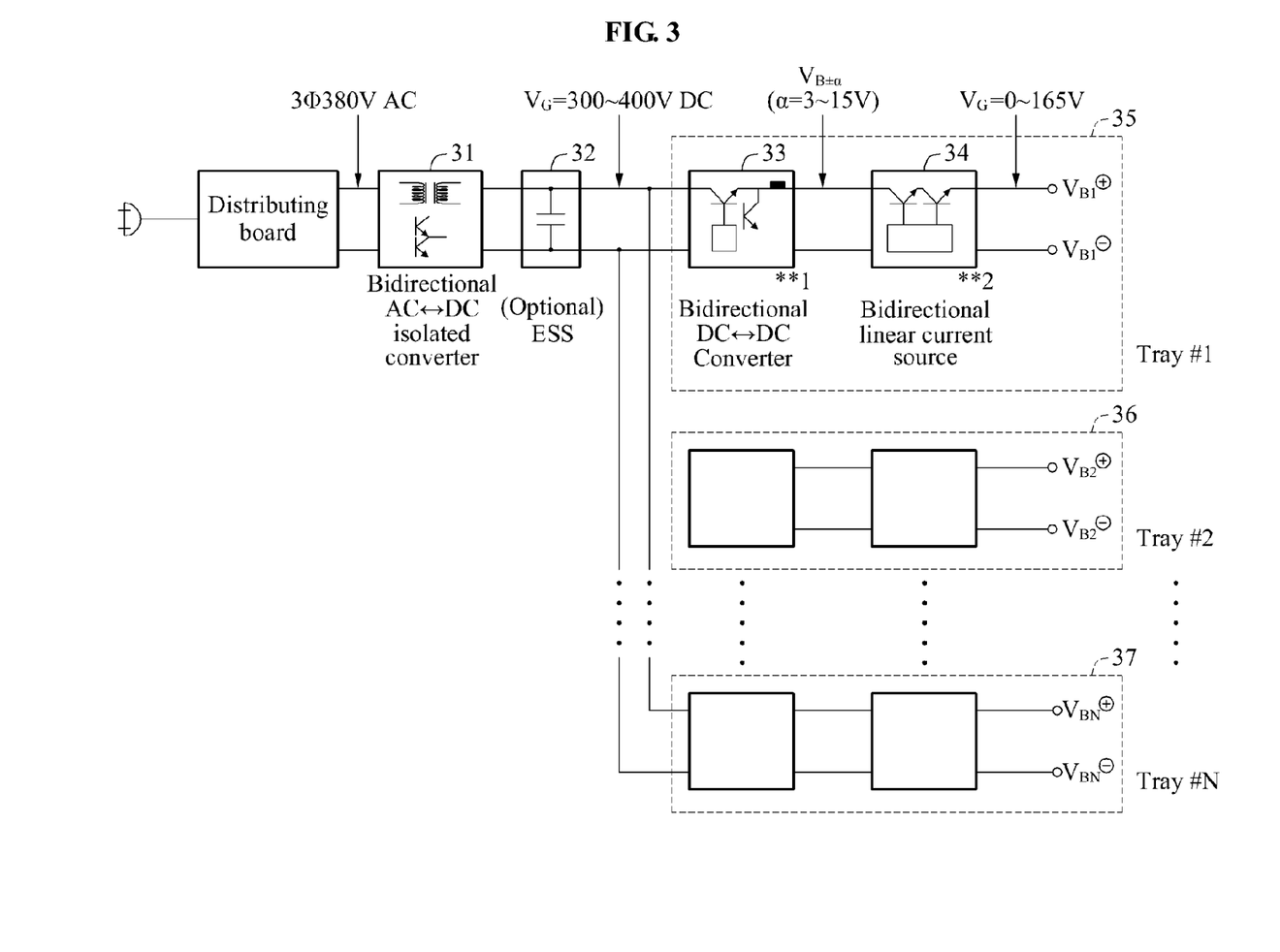
FIG. 3 is a diagram illustrating a secondary battery charge/discharge control apparatus with an active balancing circuit to supply power to each of a plurality of trays according to an embodiment of the present invention.

FIG. 3 is a diagram illustrating a secondary battery charge/discharge control apparatus with an active balancing circuit to supply power to each of a plurality of trays according to an embodiment of the present invention. The bidirectional AC/DC converter 22 and the DC ESS 23 of FIG. 2 generally corresponds to a bidirectional AC/DC converter 31 and the ESS 32 of FIG. 3, respectively. As shown in FIGS. 2 and 3, the bidirectional AC/DC converter 31 and the ESS 32 may be electrically connected to a plurality of trays, and may simultaneously supply power to charge and discharge secondary batteries.

In FIG. 3, a bidirectional DC/DC converter 33, and a bidirectional linear current source 34 are used to precisely control current and may be installed in each of trays 35, 36 and 37. In each of the trays 35, 36 and 37, a plurality of secondary batteries, for example tens to hundreds of secondary batteries, may be connected in series, and may be charged and discharged. $V_{B1}^+$ and $V_{B1}^-$ output from the bidirectional linear current source 34 is generally the same as $V_{B1}^+$ and $V_{B1}^-$ of FIG. 4. In the top portion of FIG. 3, a voltage or a voltage control range in each end is shown. This is merely an example, and there is no limitation thereto.

Figure 4:
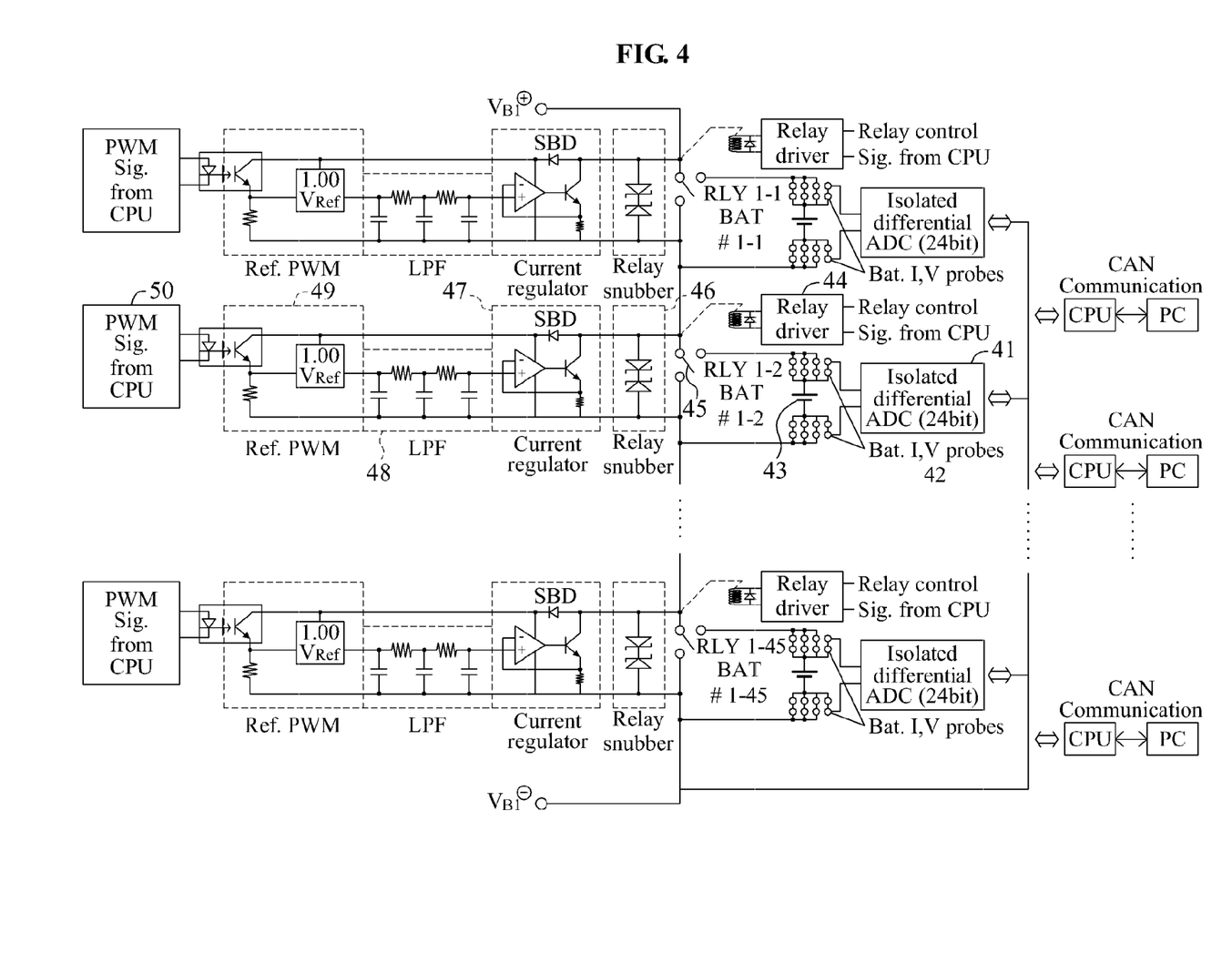
FIG. 4 is a diagram illustrating a circuit for charging and discharging each of tens to hundreds of secondary batteries in a single tray according to an embodiment of the present invention.

FIG. 4 is a diagram illustrating a circuit for charging and discharging each of tens to hundreds of secondary batteries in a single tray according to an embodiment of the present invention. Referring to FIG. 4, battery probes 42 may be installed in both ends of a battery, and may be configured to measure a voltage of both of the ends of the battery. A battery measurement analog-to-digital converter (ADC) (isolated differential analog-to-digital converter (ADC) 41 may be connected to the battery probes 42, and may be configured to measure voltage, current, and temperature, and to transmit the measured voltage, the measured current, and the measured temperature to a controller.

The battery measurement ADC 41 may convert an analog voltage measured between the battery probes 42 to a digital signal, and may use the digital signal to control charging and discharging based on the measured voltage of both the ends of the battery.

Each of the plurality of secondary batteries may include an isolated battery measurement system (IBMS) configured to precisely measure voltage, current, temperature, and the like that indicate a state of each of the batteries when the batteries are isolated from each other. An analog value measured by the isolated BMS may be converted to a digital signal by an ADC. The battery measurement ADC 41 may convert a measured analog signal to a digital signal by combining the isolated BMS and the ADC.

In FIG. 4, a relay driver 44 may be configured to allow a relay 45 to operate, in response to a control signal received from a controller including a single CPU installed in a single tray. Each of trays may include a controller to charge and discharge each of the plurality of secondary batteries. The controller may include a CPU and a memory, and a control program required to charge and discharge a secondary battery may be loaded in the controller.

The control program may include units that are configured to control a pulse width modulation (PWM) signal required to charge and discharge a secondary battery, and configured to control a constant current (CC) mode and a CV mode required to charge and discharge batteries connected in series.

A single tray may include a single controller, and a single microprocessor, for example a CPU. The controller may control charging and discharging of each of the batteries 43 connected in series. The microprocessor may be connected to the controller via a typical communication unit, and may generate a control signal.

Additionally, to efficiently and stably charge and discharge each of the batteries 43, a sensor to measure temperature, voltage, current, and the like may be installed in a required position relative to the controller. The controller may receive a measurement value from each sensor. A controller installed in each of the trays may be connected to a host personal computer (PC), and may be configured to exchange signals with the host PC using a wired or wireless communication unit.

In FIG. 4, a relay snubber 46 may be installed between both ends of the relay 45. The relay snubber 46 may prevent current flow from being interrupted due to opening of a circuit instantly when the relay 45 moves from one contact to another contact, may prevent a contact from being damaged by a spark generated when the contact is attached, and may increase durability of the relay 45. In other words, the relay snubber 46 may prevent opening of the circuit and a damage of the contact by bypassing current between both ends of the relay 45 immediately when the relay 45 is open, so that the circuit may stably operate and the durability of the relay 45 may increase.

An active balancing circuit may receive a PWM signal from the controller including the CPU, and may control a current using a current regulator. For example, referring to FIG. 4, an active balancing circuit may include a current regulator 47, a low-pass filter (LPF) 48, and PWM signal input units 49 and 50 to input a PWM signal from the controller including the CPU.

Figure 5:
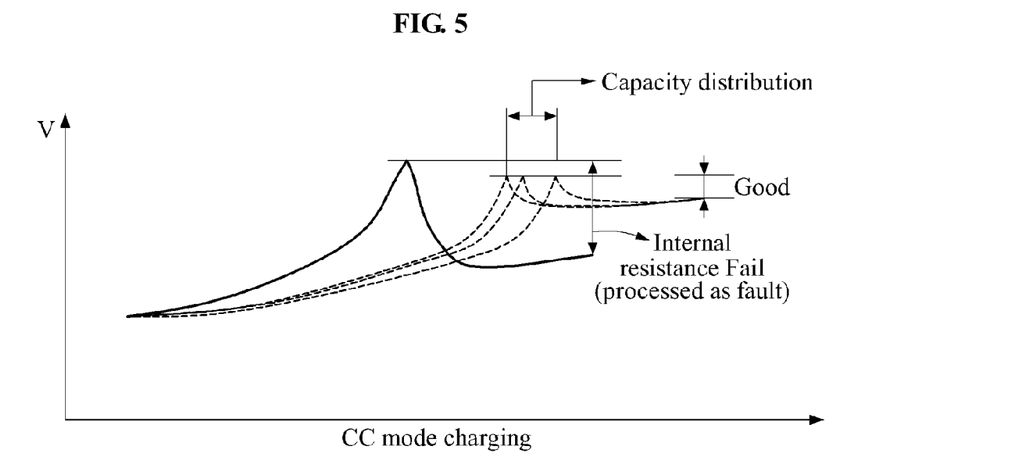
FIG. 5 is a graph illustrating capacity distribution and internal resistance of each of a plurality of secondary batteries used in charging and discharging according to an embodiment of the present invention.

FIG. 5 is a graph illustrating capacity distribution and internal resistance of each of a plurality of secondary batteries used in charging and discharging according to an embodiment of the present invention. In general, the same amount of current may flow in circuit components of a series circuit in which secondary batteries are connected in series within a single tray, and the plurality of secondary batteries may have slightly different characteristics, for example capacity, internal resistance, and the like.

Referring to FIG. 5, when initial charging is completed, a first battery discharged over a set value may be processed as a faulty battery due to an extremely high internal resistance of the first battery. During charging and discharging, a second battery, a third battery, and a fourth battery may be discharged within the set value. The second battery to the fourth battery may be determined to be in a good state, and may be normally charged and discharged.

As shown in FIG. 5, charging and discharging in a CC mode and a CV mode may be enabled using an active balancing circuit, even when secondary batteries connected in series have different characteristics including different capacities and different internal resistances.

According to embodiments of the present invention, when characteristics, for example, capacities, internal resistances, and the like of batteries are different from each other, an active balancing circuit may compensate for such characteristics. Accordingly, it is possible to achieve the same operation and affect as if secondary batteries with equivalently the same characteristics are connected in series and are charged and discharged.

Additionally, when a difference between capacities and/or internal resistance values of secondary batteries are distributed within a narrow range, for example about 5%, a balancing circuit capacity controlled by the active balancing circuit may also have a small value corresponding to about 5% of the total capacity.

The active balancing circuit may be designed and manufactured to be applied, despite a difference between capacities and/or internal resistance values of batteries being greater than 5%.

Figure 6:
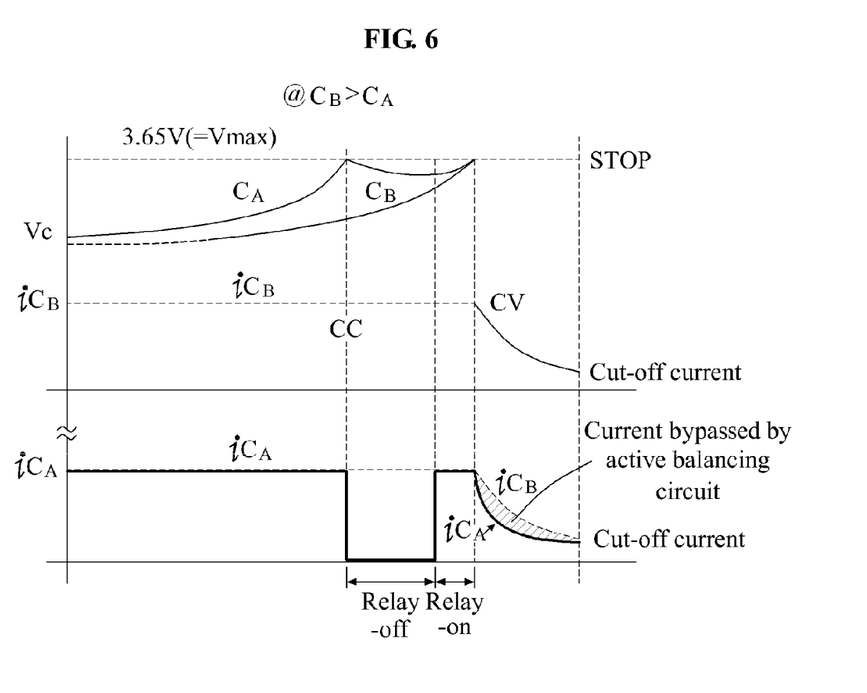
FIG. 6 is a graph illustrating a process for charging and discharging secondary batteries having different capacities and/or different internal resistances, using a relay and an active balancing circuit according to an embodiment of the present invention.

FIG. 6 is a graph illustrating a process for charging and discharging secondary batteries having different capacities and/or different internal resistances, using a relay and an active balancing circuit according to an embodiment of the present invention. In various embodiments, when batteries having different capacities and different internal resistances are connected in series, and are charged and discharged using a single bidirectional constant current source, a difference in characteristics between the batteries may be overcome, and CV charge/discharge may be enabled in a series circuit, by adding an active balancing circuit configured to add or subtract a predetermined or other defined amount of current in both ends of each of the batteries.

FIG. 6 illustrates a process of charging and discharging the two secondary batteries having different characteristics, and a capacity $C_B$ of a secondary battery may be greater than a capacity $C_A$ of the other secondary battery. For example, secondary batteries having different capacities may be charged and discharged in a CC mode within a single tray, until each of the secondary batteries reaches a first voltage Vmax. In this example, after a point in time at which a last secondary battery among the secondary batteries reaches the first voltage Vmax, the secondary batteries may be charged and discharged in a CV mode.

Additionally, secondary batteries reaching the first voltage Vmax during charging and discharging may each include a unit to control the other secondary batteries to reach the first voltage Vmax at the point in time by turning on or off a relay in the CC mode. In the CV mode, all the plurality of secondary batteries may continue to be charged and discharged using an active balancing circuit, until the plurality of secondary batteries reach a cut-off current.

In the CV mode, all the plurality of secondary batteries may be controlled to maintain the same voltage by appropriately subtracting current of a battery with a largest capacity in a state in which a standard is satisfied in the active balancing circuit. A deviation of charging voltage may be desirably equal to or less than 2 millivolts (mV).

When the CC mode and the active balancing circuit are used, a plurality of secondary batteries that are connected in series and that have different capacity distributions may be charged at the same voltage.

Figure 7:
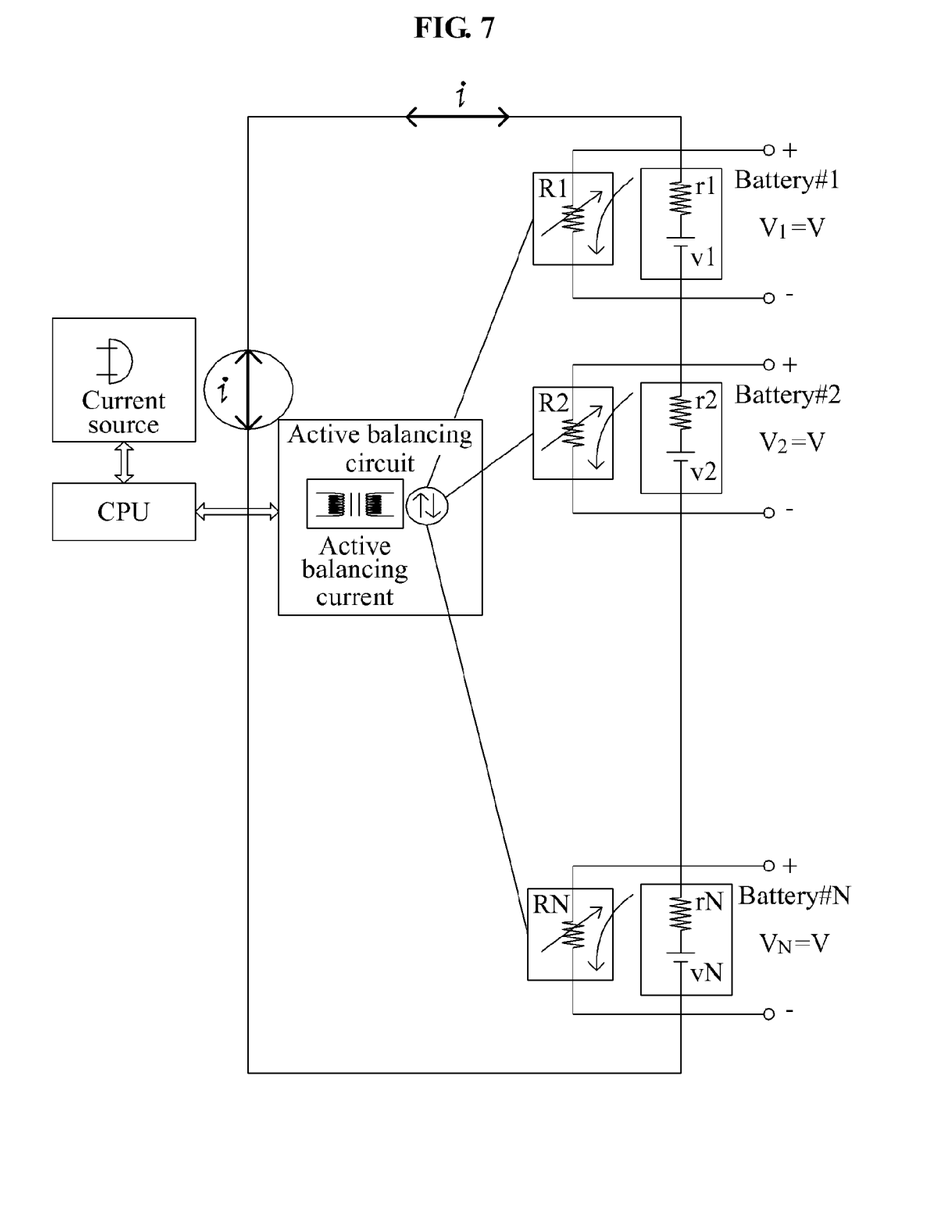
FIG. 7 is a diagram illustrating an active balancing circuit to charge and discharge each of a plurality of secondary batteries according to an embodiment of the present invention.

FIG. 7 is a diagram illustrating an active balancing circuit to charge and discharge each of a plurality of secondary batteries according to an embodiment of the present invention. In this figure, values of variable resistors, for example R1, R2, RN, and the like, may be changed using a PWM signal generated by a controller including a CPU, so that the same voltage in both ends of each of secondary batteries may be maintained. The variable resistors may be installed between both ends of each of the plurality of secondary batteries.

Figure 8:
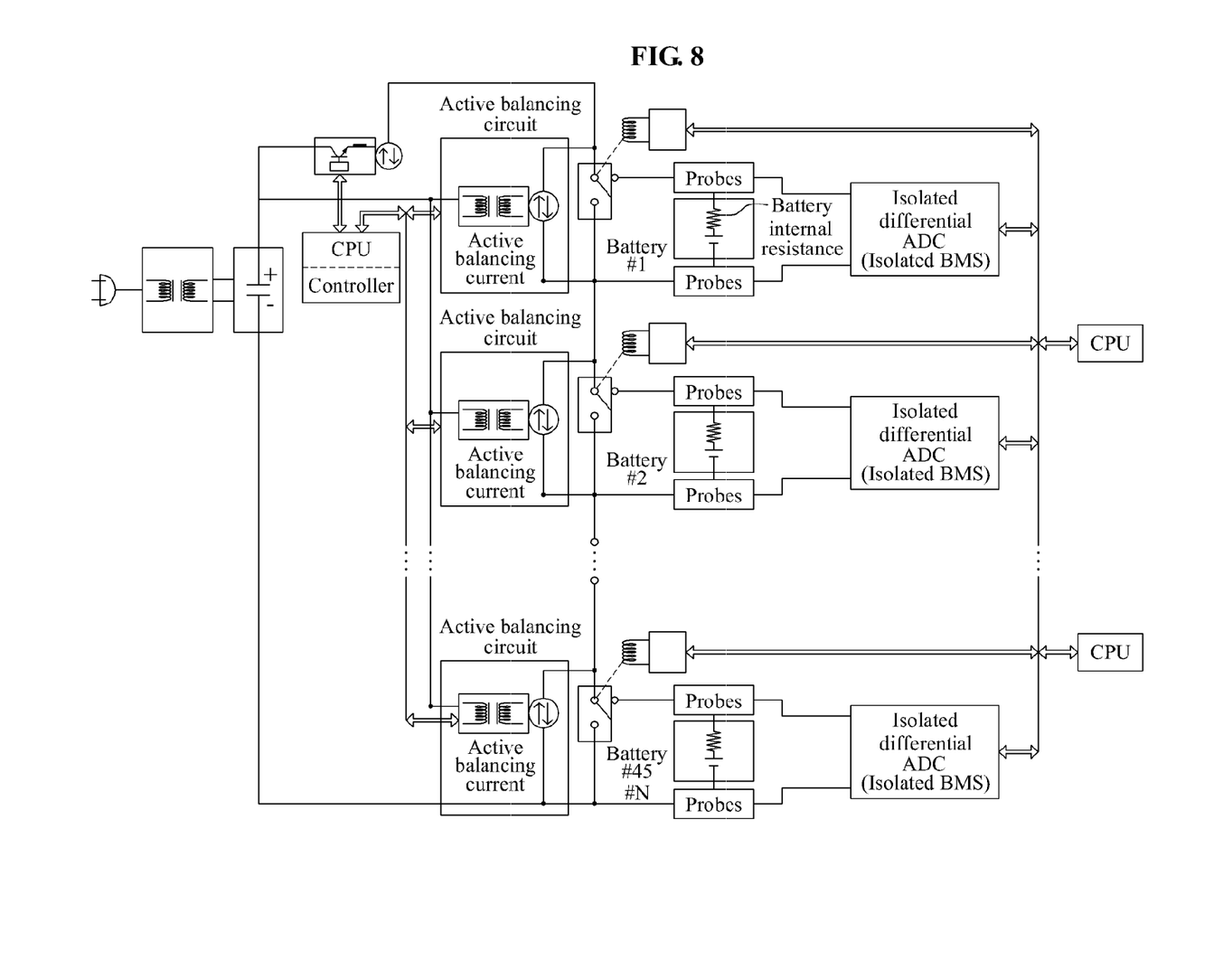
FIG. 8 is a diagram illustrating a single circuit as a combination of the secondary battery charge/discharge control apparatus of FIG. 3 and the circuit of FIG. 4, in an apparatus configured to charge and discharge secondary batteries connected in series within a single tray in a constant current (CC) mode and a constant voltage (CV) mode according to an embodiment of the present invention.
Figure 9:
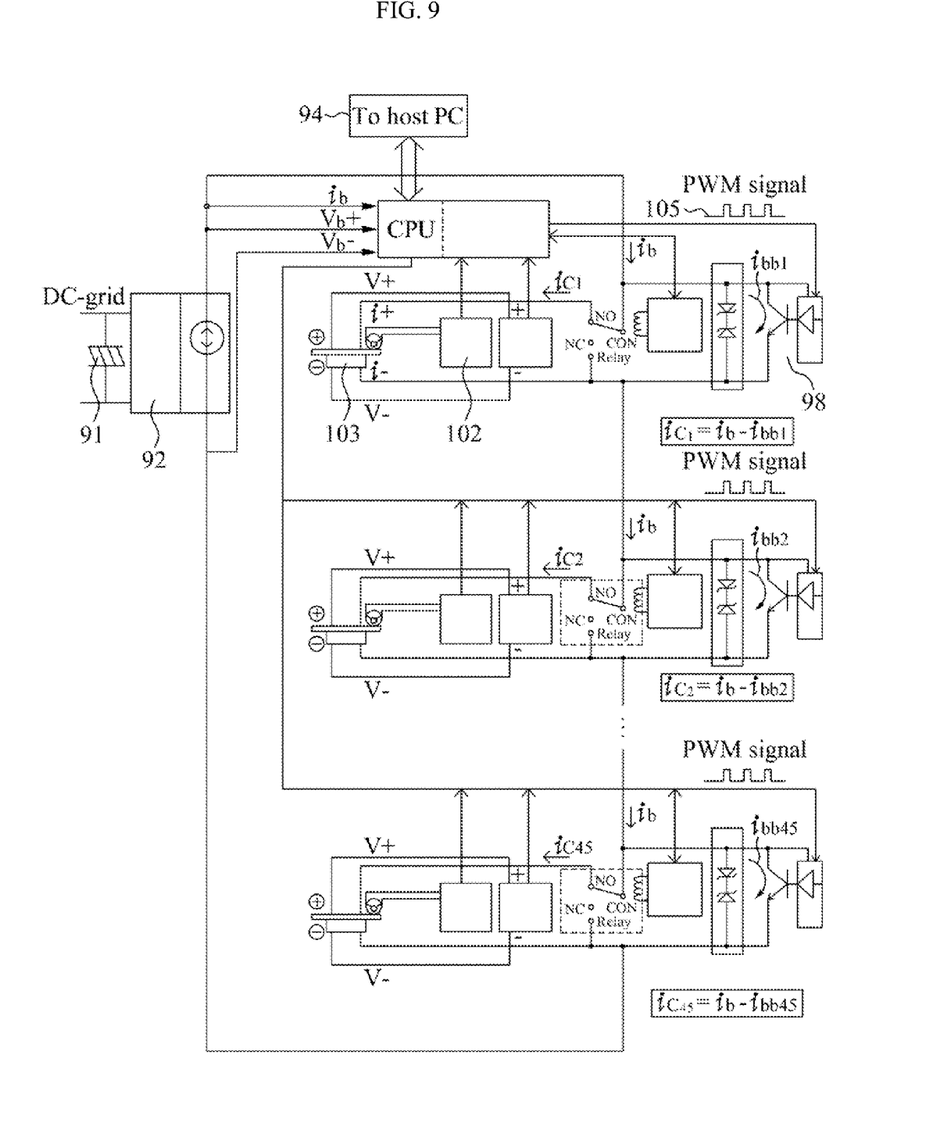
FIG. 9 is a diagram illustrating the charge/discharge circuit as that shown in FIG. 8, to illustrate a charge/discharge principle based on a current flow according to an embodiment of the present invention.

FIG. 8 is a diagram illustrating a single circuit as a combination of the secondary battery charge/discharge control apparatus of FIG. 3 and the circuit of FIG. 4, in an apparatus configured to charge and discharge secondary batteries connected in series within a single tray in a constant current (CC) mode and a constant voltage (CV) mode according to an embodiment of the present invention. FIG. 9 is a diagram illustrating the charge/discharge circuit as that shown in FIG. 8, A controller may control a secondary battery to be stably and quickly charged and discharged based on current, temperature, voltage, and the like that are received from each sensor. In FIG. 9, to stably and efficiently control charging and discharging, $V_b$, currents ib and $ibb_1$ to $ibb_{45}$, a voltage between both ends of a battery, temperature of a battery, and the like may be measured.

In various embodiments, a main circuit used to perform charging and discharging may be represented by a bold black line of FIG. 9, and may be configured to charge and discharge each of the batteries connected in series while a constant current supplied from a linear current source passes through each of the batteries.

Batteries 103 connected in series may have different capacities and different charge/discharge characteristics including internal resistance for each manufacturer. Additionally, batteries manufactured by the same manufacturer may have different capacities and different characteristics.

When batteries having different characteristics are simultaneously charged and discharged in series, charging may not be performed under the same condition. This is because, when a large-capacity battery and a small-capacity battery are charged under the same condition, the small-capacity battery may reach a desired charging condition, earlier than the large-capacity battery, and when charging continues to be performed, the batteries may be exploded due to excess of a maximum voltage for charging.

Accordingly, it is often desirable to simultaneously charge a plurality of batteries connected in series within a single tray, at a set maximum voltage (for example, the maximum voltage Vmax of FIG. 6), based on a difference in characteristics including an internal resistance and a capacity of each of the batteries, while preventing occurrence of the above problem.

In embodiments of the present invention, when batteries having different capacities and different internal resistances are connected in series, and are charged and discharged using a single bidirectional constant current source, a difference in characteristics and internal resistances between the batteries may be overcome, and charging and discharging may be enabled in a set condition, by adding an active balancing circuit configured to add or subtract a predetermined amount of current in both ends of each of the batteries.

As described above with reference to FIG. 6, the plurality of secondary batteries having different capacities may be charged and discharged within a single tray in the CC mode, until each of the plurality of secondary batteries reaches the first Vmax of 3.65 V.

After a point in time at which a last secondary battery among the plurality of secondary batteries reaches the first voltage Vmax, the plurality of secondary batteries may be charged and discharged in the CV mode within the single tray.

When secondary batteries having different capacities are charged and discharged in series within a single tray, secondary batteries reaching the first voltage Vmax may control the other secondary batteries to reach the first voltage Vmax based on a point in time at which a last secondary battery among the secondary batteries reaches the first voltage Vmax, by turning on or off a relay in the CC mode. In the CV mode, all the plurality of secondary batteries may continue to be charged and discharged using an active balancing circuit installed in each of the plurality of secondary batteries, during a period from the point in time to a cut-off current point of FIG. 6.

As shown in FIG. 7, the active balancing circuit may be configured to control a duty ratio and a frequency of a PWM signal supplied by the controller including the CPU, to control a current (for example, the current $ibb_1$ of FIG. 9) by turning on or off a switching element, and to control a value of a current flowing to each of the batteries (for example, the current $ic_1$ flowing to a $1^{st}$ battery in FIG. 9).

One process includes terminating charging of secondary batteries having different internal resistances and different capacities in the same current state and a maximum voltage (for example, the maximum voltage Vmax of 3.65 V of FIG. 6), using a relay (or a switching circuit) and an active balancing circuit that are key technical components.

As described above with reference to FIG. 6, a process may simultaneously charge and discharge tens to hundreds of secondary batteries connected in series within a single tray at a set maximum voltage, using a CC mode and a CV mode, by a control program loaded in a controller including a CPU.

A charge/discharge algorithm according to embodiments of the present invention may be configured to measure voltage at both ends of each of batteries connected in series during charging and discharging in a controller including a CPU, and to turn off a relay to prevent current from flowing to a corresponding battery when the measured voltage reaches the maximum voltage Vmax, so that charging may not be performed.

A voltage of each of a plurality of secondary batteries connected in series within a single tray may be continuously measured. When the measured voltage is reduced to a set voltage due to discharging, discharging may be interrupted by turning off the relay. The relay may be controlled to be turned on or off repeatedly until a point in time at which a last secondary battery among the plurality of secondary batteries reaches the maximum voltage Vmax (for example, a cut-off voltage of 3.65 V of FIG. 6).

For example, charging and discharging may be controlled in the CC mode until a point in time at which a last secondary battery among a plurality of secondary batteries connected in series within a single tray reaches a maximum voltage. After the point in time, the CC mode may be switched to the CV mode, and charging and discharging may be finely controlled.

A CV in the CV mode in which charging and discharging are finely controlled using an active balancing circuit may, for example, correspond to the maximum voltage Vmax of 3.65 V of FIG. 6. In the CV mode, charging and discharging may be controlled by the active balancing circuits of FIGS. 8 and 9. A value of the current $ic_1$ flowing to the $1^{st}$ battery of FIG. 9 may be obtained by subtracting a value of the current $ibb_1$ from a value of a current ib.

The circuit of FIG. 9 is generally the same as that of circuit of FIG. 8, but FIG. 9 includes more detail. To facilitate understanding, FIG. 9 illustrates a flow of a current flowing to each of a plurality of batteries connected in series during charging and discharging of the batteries, which is somewhat different than that of FIG. 8.

Similarly, a value of a current $ic_2$ flowing to a $2^{nd}$ battery may be obtained by subtracting a value of a current $ibb_2$ from the value of the current ib, and a value of a current $ic_{45}$ flowing to a $45^{th}$ battery may be obtained by subtracting a value of a current $ibb_{45}$ from the value of the current ib.

When all the currents $ic_1$ to $ic_{45}$ satisfy a condition "ic1=ic2 . . . =ic45" indicating a cut-off current, charging and discharging of a plurality of secondary batteries connected in series within a single tray may be terminated, using an active balancing circuit in the CV mode. For example, when currents of all batteries connected in series in a single tray have the same values as the cut-off current at the maximum voltage of FIG. 6, charging and discharging of all the batteries may be terminated.

During charging and discharging, when the relay is turned off in a corresponding battery, a current may flow directly to a battery disposed in a lower side of the corresponding battery. An active balancing circuit 98 of FIG. 9 may include a switching element, and may operate under the control of the controller including the CPU. The controller may control a current flowing in both ends of the relay (for example, the currents $ibb_1$ to $ibb_{45}$) by turning on or off the switching element.

In FIG. 9, to control a current flowing to each of the batteries (for example, the currents $ic_1$ to $ic_{45}$) in the CV mode, a duty ratio and a frequency of a PWM signal may be controlled, the PWM signal may be supplied, and a current flowing in both ends of the switching element (for example, the currents $ibb_1$ to $ibb_{45}$) may be controlled. When currents flowing to all batteries connected in series within a single tray (for example, the currents $ibb_1$ to $ibb_{45}$) have the same values, charging may be completed.

The currents $ibb_1$ to $ibb_{45}$ and $ic_1$ to $ic_{45}$ of FIG. 9 may indicate "45" batteries connected in series, however greater or fewer batteries are possible. Accordingly, the number of batteries connected in series may be represented by "n," and currents may be represented as currents $ic_1$ to $ic_n$.

A relay snubber may include a diode or a bidirectional zener diode with a large capacity, a condenser, a resistor, and the like. Additionally, charging and discharging may be performed using a relay installed to charge and discharge each of secondary batteries, and using a switching element that performs an equal function.

Embodiment 2

Embodiment 2 relates to a secondary battery charge/discharge control method with an active balancing circuit and algorithm to charge and discharge a plurality of batteries connected in series. In Embodiment 2, the secondary battery charge/discharge control apparatus with an active balancing circuit and process to charge and discharge a plurality of batteries connected in series according to Embodiment 1 may be used.

In Embodiment 2, the secondary battery charge/discharge control method may also include simultaneously charging and discharging a plurality of secondary batteries within a single tray at a set maximum voltage, in a CC mode and a CV mode. The plurality of secondary batteries may be electrically connected in series within a single tray to be charged and discharged at a high power conversion efficiency, so that a bidirectional DC/DC converter operates at a high voltage, and may have different internal resistances and different capacities. A linear current source may supply a current to stably perform charging and discharging, regardless of a change in a voltage between both ends of a battery group including the plurality of secondary batteries. A relay may control a current flowing to each of the plurality of secondary batteries. The active balancing circuit may finely control the current flowing to each of the plurality of secondary batteries, and a control program may be loaded.

Additionally, a secondary battery charge/discharge control method may include measuring, by an isolated BMS, a voltage at both ends of each of the plurality of secondary batteries while charging and discharging are performed in a controller including a CPU, and turning off the relay so that charging is not performed, to prevent a current from flowing to a corresponding secondary battery when the measured voltage reaches a maximum voltage set by the controller.

In addition, the secondary battery charge/discharge control method may include continuously measuring, by the isolated BMS, a voltage at both ends of each of the plurality of secondary batteries, when the measured voltage is reduced to a set voltage due to discharging, interrupting discharging by turning off the relay, and controlling charging and discharging by turning on or off the relay repeatedly until a point in time at which a last secondary battery among the plurality of secondary batteries reaches a maximum voltage (for example, the cut-off voltage of 3.65 V of FIG. 6).

In other words, a secondary battery charge/discharge control method may include controlling charging and discharging in the CC mode until the point in time at which the last secondary battery reaches the maximum voltage, switching the CC mode to the CV mode after the point in time, and controlling the plurality of secondary batteries to have the same currents as a cut-off current. Furthermore, the secondary battery charge/discharge control method may include terminating charging and discharging when all the plurality of secondary batteries have the same cut-off current value at the maximum voltage of FIG. 6.

The secondary battery charge/discharge control method of Embodiment 2 may have similar technical configurations to technical configurations of the secondary battery charge/discharge control apparatus of Embodiment 1. Accordingly, all the technical configurations of the secondary battery charge/discharge control apparatus may also be applied to the secondary battery charge/discharge control method. Further description of these technical configurations will be omitted herein to avoid redundancy.

Embodiments of the present invention may provide an active balancing control apparatus and method with an active balancing algorithm to charge and discharge a plurality of batteries connected in series. The active balancing control apparatus and method may be designed and manufactured to simultaneously charge and discharge a plurality of batteries connected in series, using an active balancing circuit and a relay, to achieve balancing of each of the batteries so that the batteries may be charged at a set maximum voltage in a CV mode, in an apparatus for simultaneously charging and discharging a plurality of secondary batteries connected in series. The batteries may have different charge/discharge characteristics, because capacities and internal resistances of the batteries are not exactly the same. Thus, according to embodiments of the present invention, it is possible to simultaneously charge and discharge a plurality of batteries connected in series using a maximum power, thereby providing a very high industrial applicability.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A secondary battery charge/discharge control apparatus, comprising
    a plurality of secondary batteries electrically connected in series and each configured to be charged and discharged to permit a bidirectional direct current (DC)-to-DC (DC/DC) converter to operate at a high voltage, wherein the plurality of secondary batteries respectively have different internal resistances and different capacities;
    a relay operatively coupled to the plurality of secondary batteries and being configured to control current flowing to each of the plurality of secondary batteries, to permit the charging and discharging of the plurality of secondary batteries;
    an active balancing circuit to maintain a same amount of voltage of both ends of each battery of the plurality of secondary batteries by changing a value of a variable resistor installed between the both ends of each battery of the plurality of secondary batteries using a pulse width modulation (PWM) signal; and
    a controller operatively coupled to the relay and the active balancing circuit and being configured to:
    generate the PWM signal;
    charge and discharge the plurality of secondary batteries in a constant current (CC) mode; and
    simultaneously charge and discharge the plurality of secondary batteries in a constant voltage (CV) mode at a set maximum voltage using the active balancing circuit.

2. The apparatus of claim 1, further comprising:
    a bidirectional linear current source to control, in response to the controller, all of the plurality of secondary batteries within a single tray, the bidirectional linear current source being electrically connected to a next end of the bidirectional DC/DC converter.

3. The apparatus of claim 1, wherein the controller is further configured to:
    obtain a voltage measured at the both ends of each of the plurality of secondary batteries, during the charging and the discharging of the plurality of secondary batteries; and
    turn off the relay to prevent current from flowing to each of the plurality of secondary batteries when the obtained voltage for any of the plurality of secondary batteries reaches a maximum voltage.

4. The apparatus of claim 1, wherein the controller is further configured to:
    continue the charging and the discharging of the plurality of secondary batteries in the CC mode until a time point at which a last secondary battery among the plurality of secondary batteries connected within a single tray reaches a maximum voltage;
    switch from the CC mode to the CV mode after the time point and perform the simultaneous charging of the plurality of secondary batteries in the CV mode; and
    terminate the charging and the discharging of the plurality of secondary batteries in the CV mode when all of the plurality of secondary batteries reach a cut-off current.

5. The apparatus of claim 1, further comprising:
    a battery measurement analog-to-digital converter (ADC) configured to repeatedly measure a voltage at both ends of each of the plurality of secondary batteries, and wherein the controller is further configured to:
    turn on the relay to perform the charging and the discharging of the plurality of secondary batteries; and
    control the charging and the discharging in the CV mode by repeatedly turning on and off the relay until a time point at which a last secondary battery among a plurality of secondary batteries within a single tray reaches a maximum voltage.

6. The apparatus of claim 5, further comprising:
    a relay snubber to stably operate when the relay installed between the plurality of secondary batteries is open and when the relay is connected to a contact after opening, so that each of the plurality of secondary batteries is charged or discharged.

7. The apparatus of claim 1, wherein in the CV mode, the PWM signal is supplied to control a current flowing to each battery of the plurality of secondary batteries to reach a cut-off current.

8. The apparatus of claim 1, further comprising:
    secondary battery probes installed in both ends of each battery of the plurality of secondary batteries, to measure a voltage at both ends of each battery of the plurality of secondary batteries; and
    a battery measurement ADC connected to the secondary battery probes, to measure a signal required to control the charging and the discharging, wherein the signal comprises the voltage.

9. A secondary battery charge/discharge control method comprising:
    charging and discharging a plurality of secondary batteries in a constant current (CC) mode, wherein the plurality of secondary batteries are electrically connected in series within a single tray to be charged and discharged at a high power conversion efficiency and to permit a bidirectional direct current (DC)-to-DC (DC/DC) converter to operate at a high voltage, and wherein the plurality of secondary batteries respectively have different internal resistances and different capacities;
    simultaneously charging and discharging the plurality of secondary batteries at a set maximum voltage using an active balancing circuit in a constant voltage (CV)

mode, wherein the simultaneously charging and discharging occur after the charging and discharging in the CC mode;

maintaining a same amount of voltage of both ends of each battery of the plurality of secondary batteries by the active balancing circuit by changing a value of a variable resistor installed between the both ends of each battery of the plurality of secondary batteries using a pulse width modulation (PWM) signal;

supplying, by a linear current source, a current to stably perform the charging and discharging regardless of a change in a voltage between both ends of a battery group comprising the plurality of secondary batteries;

controlling, by a relay, current flowing to each battery of the plurality of secondary batteries; and controlling, by the active balancing circuit, the current flowing to each battery of the plurality of secondary batteries.

10. The method of claim 9, further comprising:

measuring, by a battery measurement analog-to-digital converter (ADC), a voltage at both ends of each battery of the plurality of secondary batteries while the charging and discharging are performed, the battery measurement ADC being configured to measure a signal comprising the voltage; and turning off the relay so that the charging is not performed, to prevent current from flowing to a corresponding secondary battery when the measured voltage reaches a maximum voltage.

11. The method of claim 9, further comprising:

continuously measuring, by a battery measurement analog-to-digital converter (ADC), a voltage at both ends of each battery of the plurality of secondary batteries; and when the measured voltage is reduced to a set voltage due to discharging, interrupting the discharging by turning off the relay, and controlling the charging and discharging by turning on and off the relay repeatedly until a time point at which a last secondary battery among the plurality of secondary batteries reaches a maximum voltage.

12. The method of claim 9, further comprising:

controlling the charging and discharging in the CC mode until a time point at which a last secondary battery among the plurality of secondary batteries reaches a maximum voltage, and switching the CC mode to the CV mode after the time point; and terminating the charging and discharging when all the plurality of secondary batteries have the same currents as a cut-off current at the maximum voltage, using the active balancing circuit, in the CV mode.

\* \* \* \* \*